July 4, 1967 — D. R. GREENQUIST — 3,329,317

BIN

Filed Aug. 12, 1965

INVENTOR
DUANE R. GREENQUIST

BY Olsen and Stephenson
ATTORNEYS

United States Patent Office 3,329,317
Patented July 4, 1967

3,329,317
BIN
Duane R. Greenquist, Beatrice, Nebr., assignor to Hoover Ball and Bearing Company, Saline, Mich., a corporation of Michigan
Filed Aug. 12, 1965, Ser. No. 479,124
2 Claims. (Cl. 222—184)

This invention relates generally to handling free flowing materials and more particularly to a bin especially suited for handling such materials.

Various types of bins are presently employed in various applications to handle bulk materials such as pelletized plastic. Bins may be filled with pelletized plastic at a raw materials manufacturing plant and then transported to a plastics fabricator where the bin serves as a storage container until the plastic is used. Suitable equipment unloads the bin and conveys the plastic to fabricating equipment such as an extruder. Bins may be unloaded by suction-type equipment including a hose which is inserted through an inlet opening in the top of the bin and draws pelletized plastic out of the bin. Other types of bins must be tipped or inverted to discharge the contents of the bin onto various types of conveyors. Some of the present bins are difficult to fully discharge and others require costly specialized handling equipment which is out of proportion to the bin cost in the case of small operations.

The objects of this invention are to provide a bin particularly suited for handling free flowing materials such as pelletized plastic or the like, that is constructed with an inclined trough shape material supporting wall on which the material will flow under the action of gravity so that the bin can be discharged without any special tipping or inverting equipment, has a bottom wall and depending legs so that it can be moved by means of an ordinary hand dolly, and has both a gravity outlet and a side suction outlet through either of which the entire bin contents can be removed.

Other features, objects and advantages of the present invention will become apparent from a consideration of the following description, the appended claims and the accompanying drawings in which:

Figure 1:
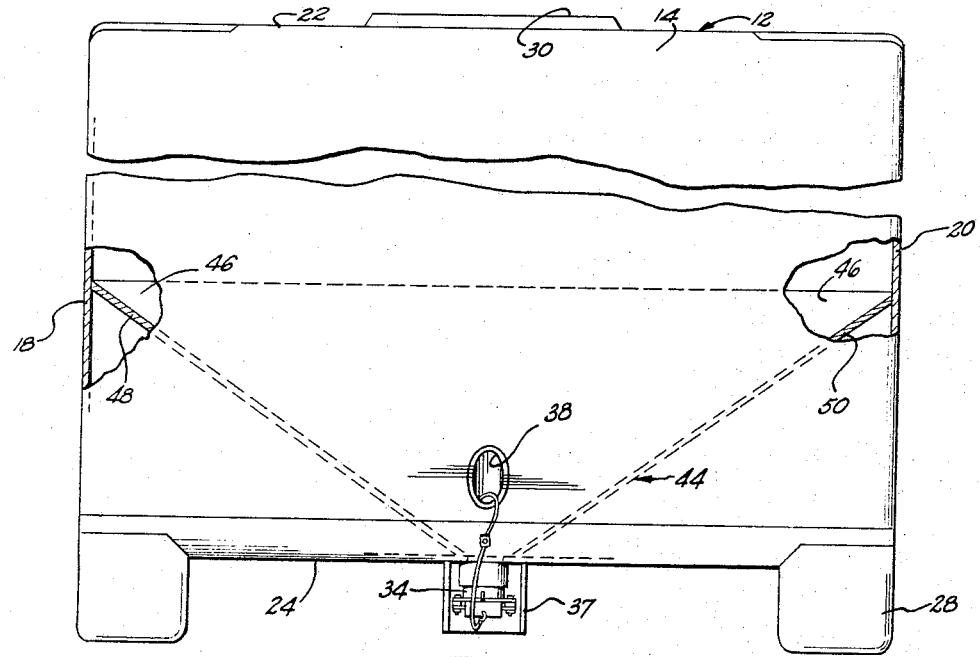
FIGURE 1 is a front view of a bin constructed in accordance with the present invention.
Figure 2:
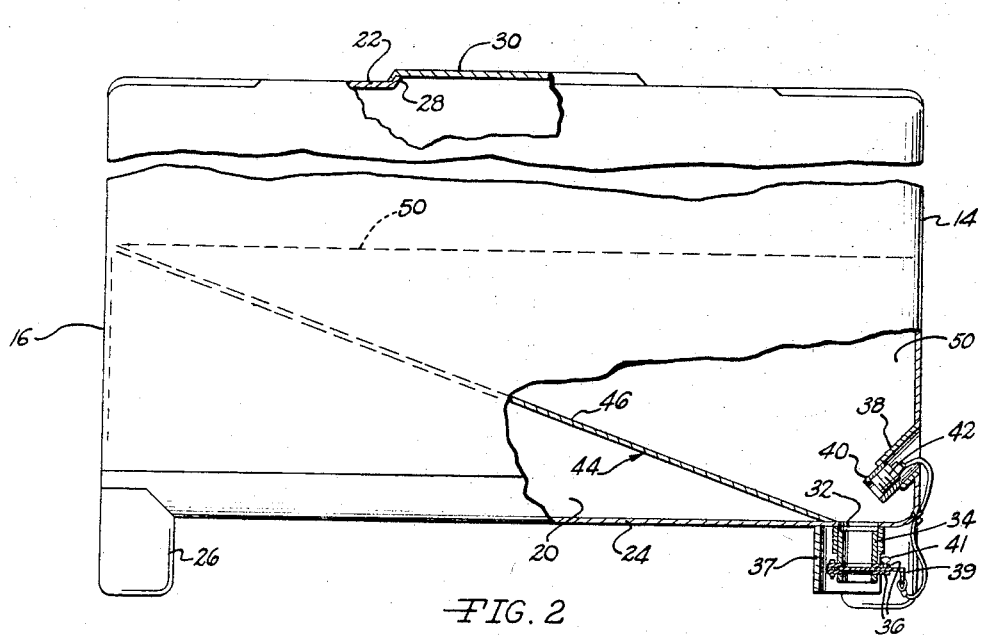
FIGURE 2 is a side view of the bin shown in FIG. 1 with a first portion of the bin broken away to illustrate a removable cover on the bin and a second portion of the bin broken away to illustrate a pair of discharge outlets together with an inclined false bottom wall which directs material in the bin toward the outlets.

Referring to the drawings more particularly, a bin 12 constructed in accordance with the present invention has a generally cubic external configuration and is fashioned with a front wall 14, a rear wall 16, opposed side walls 18, 20, a top wall 22 and a bottom wall 24. Walls 14–24 are generally flat and straight and in the preferred embodiment are made of rigid sheet metal assembled into a rigid unit. Rigid legs 26 are fastened on bin 12 at each of the four corners of the bottom wall 24. The top wall 22 has a centrally disposed opening 28 which serves as an inlet to load bin 12 with raw materials. A cover 30 is removably mounted on the top wall 22 for closing the opening 28.

The bottom wall 24 is fashioned with an opening 32 disposed closely adjacent the front wall 14 and generally midway between the side walls 18, 20. Opening 32 can serve as either a gravity or vacuum discharge outlet depending on the type of discharge equipment which it is desired to use. Fastened on the bottom wall 24 around opening 32 is an annular sleeve unit 34 which extends downwardly from the opening 32 and is provided intermediate its ends with a pair of radial flanges 36. A slide gate 39 is slidably mounted between flanges 36 for movement between positions opening and closing discharge sleeve unit 34. A set screw 41 mounted on a flange 36 holds the gate 39 in a moved position. A generally U-shaped guard 37 is fastened on the bottom wall 24 around the flange 34 with the guard 37 being open on its bottom and front sides. A tube 38 is fastened in the front wall 14 above and generally vertically in line with opening 32. Tube 38 projects through wall 14 to communicate at one end exteriorly of bin 12 and extends downwardly and rearwardly from wall 14 toward the outlet opening 32. Fastened in the lower inner end of tube 38 is a fitting 40 which receives a plug 42 threadably or otherwise removably secured in the fitting 40. Tube 38 and fitting 40 serves as a suction discharge outlet for bin 12 with the lower end of fitting 40 opening above and closely adjacent the outlet opening 32 to facilitate complete discharge from bin 12. The inclination of tube 38 is such, in the preferred embodiment of the invention, that material in bin 12 does not flow out of tube 38 when plug 42 is removed.

Fastened in the lower portion of bin 12 is a false bottom wall 44 having a bottom or center portion 46 and side portions 48 and 50. The center portion 46 is generally flat and triangular-shaped and slopes downwardly and converges laterally inwardly from the rear wall 16 to the bottom wall 24 at a position close to the outlet opening 32. The rear end of center portion 46 extends substantially across the full width of the rear wall 16 and is secured to the wall 16. The side portions 48 and 50 of wall 44 are also generally flat, triangular shaped. Each is inclined upwardly and laterally outwardly from one edge of the center portion 46 and is fastened at its laterally outer edge to the side wall 18 or 20, as the case may be. The configuration of wall portions 46, 48, 50 imparts a converging trough or hopper shape to the false bottom wall 44 so that raw material in the bin is directed toward the gravity discharge outlet formed by opening 32 and the suction discharge outlet formed by tube 38 and fitting 40. The false bottom wall 44, which is also made of rigid sheet metal is sometimes referred to hereinafter as an inner wall because it is above the actual bottom wall 24, and sometimes as a bottom wall because it forms the bottom of the material containing chamber in the bin 12.

The bin of this invention is particularly advantageous in connection with the transport and storage of free flowing bulk granular materials, since such materials can be unloaded effectively and economically either through the outlet opening 32 or through the outlet tube 38 without the need for any special bin handling or mounting equipment. If a particular user has a floor conveyor, all of the material in bin 14 can be discharged through the gravity outlet opening 32 directly onto the conveyor. If the user has suction-type unloading apparatus a hose can be inserted through the inlet tube 38 to communicate with the lowermost portion of bin 12 and effectively suck or draw all of the material from the bin 12. Also, a quick disconnect elbow (not shown) can be mounted on sleeve unit 34 and connected to vacuum apparatus for emptying the bin through opening 32 by means of suction if desired. The wall 44 is inclined toward the discharge area of the bin above opening 32 and below fitting 40 at an angle of inclination sufficient to provide for a downward flow of all of a free flowing material, such as pelletized plastic, toward the discharge area. An angle of twenty degrees is sufficient for this purpose. The provision of bottom wall 24, which is substantially horizontal when legs 26 are supported on a horizontal surface, permits easy moving of the bin 12 by engaging the wall 24 with an ordinary hand dolly.

It will be understood that the bin disclosed and described herein is presented for the purpose of explanation and illustration and is not intended to indicate limits of the invention, the scope of which is defined by the following claims.

What is claimed is:

1. A bin comprising a walled receptacle having a rear wall portion, a front wall portion and a bottom wall portion formed of rigid sheet material, supporting legs on said walled receptacle, said bottom wall portion being of substantially trough shape inclined downwardly from said rear wall portion in a direction toward a lower end of said front wall portion when said legs are supported on a substantially horizontal surface, said trough shape bottom wall portion being provided with a center portion which extends from said rear wall portion downwardly toward said front wall portion and a pair of side portions which slope downwardly toward said center portion and converge laterally inwardly toward each other in a direction extending toward the lower end of said center portion so that said bottom wall portion is operable to direct substantially all material in said bin to a lowermost discharge portion of said receptacle disposed at the lower end of said bottom wall portion and adjacent said front wall portion, and a tube fastened on said receptacle and communicating at one end through said front wall portion exteriorly of said receptacle, said tube projecting downwardly and rearwardly from said front wall portion and communicating at its lower inner end with said discharge portion.

2. A bin for use in handling free flowing materials comprising a rigid sheet metal receptacle having upright front, rear and side walls and a substantially horizontal bottom wall, a first discharge aperture disposed in said bottom wall at a position adjacent said front wall to serve as a gravity discharge outlet for said receptacle, closure means releasably mounted on said receptacle and cooperating with said aperture to control discharge through said gravity discharge outlet, a tubular member fastened on said receptacle and communicating at one end through said front wall exteriorly of said receptacle, said tubular member projecting into said receptacle from said front wall in a direction downwardly and rearwardly toward said first aperture and opening at its inner end above said first aperture, said tubular member being adapted to receive a suction device and serve as a suction discharge outlet, a plurality of rigid legs fastened on said receptacle and projecting downwardly below said bottom wall, said legs being operable to position said bottom wall in a substantially horizontal plane when said legs are supported on a substantially horizontal surface, and a rigid trough-shaped inner wall fixedly mounted in a lower portion of said receptacle above said bottom wall to direct said material toward said aperture and said inner end of said tubular member, said inner wall extending from said bottom wall upwardly and rearwardly from said first aperture to said rear wall and laterally outwardly and upwardly from said first aperture to said side walls, whereby substantially all of a free flowing material supported in said bin will flow under the action of gravity on said inner wall toward said gravity discharge outlet.

References Cited

UNITED STATES PATENTS

| | | | |
|---|---|---|---|
| 2,214,708 | 9/1940 | Mayne et al. | 222—478 X |
| 2,675,947 | 4/1954 | Wynn | 222—185 X |
| 3,028,998 | 4/1962 | Malik et al. | 222—185 X |
| 3,138,297 | 6/1964 | McKinney | 222—185 |
| 3,235,141 | 2/1966 | Couffer | 222—482 X |

FOREIGN PATENTS 879,161  10/1961  Great Britain.

ROBERT B. REEVES, *Primary Examiner.*

N. L. STACK, *Assistant Examiner.*